(12) United States Patent
Bae et al.

(10) Patent No.: US 11,876,243 B2
(45) Date of Patent: *Jan. 16, 2024

(54) BATTERY MODULE

(71) Applicant: SAMSUNG SDI CO., LTD., Yongin-si (KR)

(72) Inventors: Jangwoong Bae, Yongin-si (KR); Daeyeop Park, Yongin-si (KR); Sungyong Kim, Yongin-si (KR); Jaeho Kim, Yongin-si (KR); Soodeok Moon, Yongin-si (KR); Junhyung Lee, Yongin-si (KR); Dooyong Lim, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 240 days.

This patent is subject to a terminal disclaimer.

(21) Appl. No.: 16/656,190

(22) Filed: Oct. 17, 2019

(65) Prior Publication Data

US 2020/0127256 A1 Apr. 23, 2020

(30) Foreign Application Priority Data

Oct. 19, 2018 (KR) ........................ 10-2018-0125553

(51) Int. Cl.
*H01M 50/291* (2021.01)
*H01M 10/613* (2014.01)
(Continued)

(52) U.S. Cl.
CPC ....... *H01M 50/291* (2021.01); *H01M 10/613* (2015.04); *H01M 10/647* (2015.04);
(Continued)

(58) Field of Classification Search
None
See application file for complete search history.

(56) References Cited

U.S. PATENT DOCUMENTS

| 6,146,778 | A | 11/2000 | Rouillard et al. |
| 6,255,015 | B1 | 7/2001 | Corrigan et al. |
| (Continued) | | | |

FOREIGN PATENT DOCUMENTS

| CN | 1324499 A | 11/2001 |
| CN | 1592977 A | 3/2005 |
| (Continued) | | |

OTHER PUBLICATIONS

S. Office Action dated Mar. 17, 2021, issued in U.S. Appl. No. 16/656,324 (17 pages).

(Continued)

*Primary Examiner* — Jonathan G Leong
*Assistant Examiner* — Tony S Chuo
(74) *Attorney, Agent, or Firm* — Lewis Roca Rothgerber Christie LLP

(57) ABSTRACT

A battery module includes: a plurality of cell stacks, each of the cell stacks including: a plurality of unit cells arranged in a first direction; and an insulation member around the plurality of unit cells; and a module housing, in which a plurality of receiving parts are provided, ones of the cell stacks from among the plurality of cell stacks being located in a receiving part from among the plurality of receiving parts, and each of the receiving parts includes a fixing wall, the fixing wall being around the cell stack received therein and being in contact with the cell stack, and the module housing includes end walls at respective sides of each of the (Continued)

receiving parts in the first direction to engage end surfaces of respective sides of the cell stack received in the respective receiving part in the first direction.

13 Claims, 9 Drawing Sheets

(51) Int. Cl.
*H01M 10/647* (2014.01)
*H01M 50/209* (2021.01)
*H01M 50/233* (2021.01)
*H01M 10/625* (2014.01)

(52) U.S. Cl.
CPC ....... *H01M 50/209* (2021.01); *H01M 50/233* (2021.01); *H01M 10/625* (2015.04)

(56) References Cited

U.S. PATENT DOCUMENTS

| | | | |
|---|---|---|---|
| 6,555,264 B1 | 4/2003 | Hamada et al. | |
| 6,864,013 B2 | 3/2005 | Gow et al. | |
| 2005/0079408 A1 | 4/2005 | Hirano | |
| 2005/0255379 A1 | 11/2005 | Marchio et al. | |
| 2007/0054561 A1 | 3/2007 | Gutman et al. | |
| 2007/0087266 A1 | 4/2007 | Bourke et al. | |
| 2010/0009251 A1 | 1/2010 | Shin et al. | |
| 2010/0266887 A1 | 10/2010 | Sekino et al. | |
| 2010/0285347 A1 | 11/2010 | Saito et al. | |
| 2011/0165451 A1 | 7/2011 | Kim et al. | |
| 2011/0300433 A1 | 12/2011 | Kim | |
| 2012/0103714 A1 | 5/2012 | Choi et al. | |
| 2012/0115013 A1 | 5/2012 | Kim et al. | |
| 2012/0177970 A1 | 7/2012 | Marchio et al. | |
| 2013/0045403 A1 | 2/2013 | Shin et al. | |
| 2013/0089763 A1 | 4/2013 | Lee | |
| 2013/0207459 A1 | 8/2013 | Schröder et al. | |
| 2013/0260195 A1 | 10/2013 | Long | |
| 2014/0087221 A1 | 3/2014 | Kim et al. | |
| 2014/0141311 A1 | 5/2014 | Michelitsch | |
| 2014/0234690 A1 | 8/2014 | Le et al. | |
| 2014/0353057 A1 | 12/2014 | Adachi | |
| 2015/0042158 A1 | 2/2015 | Schmidt et al. | |
| 2015/0072178 A1 | 3/2015 | Gu | |
| 2015/0229010 A1 | 8/2015 | Ahn | |
| 2015/0357617 A1 | 12/2015 | Okada | |
| 2016/0028056 A1 | 1/2016 | Lee et al. | |
| 2016/0056427 A1 | 2/2016 | Kim et al. | |
| 2016/0118635 A1 | 4/2016 | Keller et al. | |
| 2016/0164054 A1 | 6/2016 | Yamamoto et al. | |
| 2016/0233464 A1 | 8/2016 | Nusier et al. | |
| 2016/0233468 A1 | 8/2016 | Nusier et al. | |
| 2016/0268657 A1 | 9/2016 | Park et al. | |
| 2017/0062783 A1 | 3/2017 | Kim et al. | |
| 2017/0062789 A1 | 3/2017 | Sim et al. | |
| 2017/0133706 A1 | 5/2017 | Ejima | |
| 2017/0222200 A1 | 8/2017 | Murai et al. | |
| 2017/0263910 A1 | 9/2017 | Kobayashi et al. | |
| 2017/0365888 A1 | 12/2017 | Kwon et al. | |
| 2018/0013111 A1 | 1/2018 | Wuensche et al. | |
| 2018/0026243 A1 | 1/2018 | Stojanovic et al. | |
| 2018/0102576 A1 | 4/2018 | Yamamoto et al. | |
| 2018/0109016 A1 | 4/2018 | Fees et al. | |
| 2018/0123200 A1* | 5/2018 | Golubkov | H01M 10/6563 |
| 2018/0138466 A1 | 5/2018 | Fees et al. | |
| 2018/0138473 A1 | 5/2018 | Bessho et al. | |
| 2018/0138560 A1 | 5/2018 | Bessho | |
| 2018/0175466 A1 | 6/2018 | Seo et al. | |
| 2018/0269443 A1 | 9/2018 | Takahashi et al. | |
| 2018/0294452 A1 | 10/2018 | Tan et al. | |
| 2018/0331402 A1* | 11/2018 | Inoue | B60L 50/66 |
| 2018/0337374 A1 | 11/2018 | Matecki et al. | |
| 2019/0001838 A1 | 1/2019 | Choi et al. | |
| 2019/0088911 A1 | 3/2019 | Peng et al. | |
| 2019/0123318 A1 | 4/2019 | Fees et al. | |
| 2019/0198845 A1 | 6/2019 | Bae et al. | |
| 2019/0221817 A1 | 7/2019 | Jeon | |
| 2019/0296294 A1 | 9/2019 | Hirschbeck et al. | |
| 2019/0305273 A1* | 10/2019 | Long | H01M 10/0481 |
| 2019/0348725 A1 | 11/2019 | Golubkov | |
| 2020/0006824 A1 | 1/2020 | Lim | |
| 2020/0067155 A1 | 2/2020 | Hwang et al. | |
| 2020/0127258 A1 | 4/2020 | Lim et al. | |
| 2020/0313128 A1 | 10/2020 | Schnakenberg | |
| 2021/0143505 A1* | 5/2021 | Hidaka | H01M 50/10 |

FOREIGN PATENT DOCUMENTS

| | | |
|---|---|---|
| CN | 102117930 A | 7/2011 |
| CN | 102270754 A | 12/2011 |
| CN | 102934254 A | 2/2013 |
| CN | 103035975 A | 4/2013 |
| CN | 103380511 A | 10/2013 |
| CN | 103890997 A | 6/2014 |
| CN | 104137294 A | 11/2014 |
| CN | 104617244 A | 5/2015 |
| CN | 104835980 A | 8/2015 |
| CN | 104904033 A | 9/2015 |
| CN | 104995760 A | 10/2015 |
| CN | 105552261 A | 5/2016 |
| CN | 105870370 A | 8/2016 |
| CN | 205768594 U | 12/2016 |
| CN | 106299176 A | 1/2017 |
| CN | 106486622 A | 3/2017 |
| CN | 106797005 A | 5/2017 |
| CN | 206210887 U | 5/2017 |
| CN | 206584990 U | 10/2017 |
| CN | 107528019 A | 12/2017 |
| CN | 107591500 A | 1/2018 |
| CN | 107644960 A | 1/2018 |
| CN | 107658401 A | 2/2018 |
| CN | 207199697 U | 4/2018 |
| CN | 207398218 U | 5/2018 |
| CN | 108365156 A | 8/2018 |
| CN | 108463902 A | 8/2018 |
| CN | 207690855 U | 8/2018 |
| CN | 207818706 U | 9/2018 |
| CN | 108630851 A | 10/2018 |
| CN | 210628373 U | 5/2020 |
| EP | 2450990 A2 | 5/2012 |
| EP | 2 608 309 A1 | 6/2013 |
| EP | 3 273 500 A1 | 1/2018 |
| EP | 3267507 A1 | 1/2018 |
| EP | 3 316 340 A1 | 5/2018 |
| EP | 3 327 817 A1 | 5/2018 |
| JP | 2003-249202 A | 9/2003 |
| JP | 2004-171856 A | 6/2004 |
| JP | 3906706 B2 | 4/2007 |
| JP | 2009-231042 A | 10/2009 |
| JP | 2013-8521 A | 1/2013 |
| JP | 2017-37754 A | 2/2017 |
| JP | 6095813 B2 | 3/2017 |
| JP | 6117308 B2 | 4/2017 |
| JP | 6224321 B2 | 11/2017 |
| JP | 2018-073551 A | 5/2018 |
| KR | 10-2010-0055477 A | 5/2010 |
| KR | 10-2013-0001381 A | 1/2013 |
| KR | 10-2013-0078933 A | 7/2013 |
| KR | 10-2013-0113740 A | 10/2013 |
| KR | 10-2015-0029371 A | 3/2015 |
| KR | 10-1584295 B1 | 1/2016 |
| KR | 10-2016-0037542 A | 4/2016 |
| KR | 10-2017-0011212 A | 2/2017 |
| KR | 10-2017-0025074 A | 3/2017 |
| KR | 10-2017-0053429 A | 5/2017 |
| KR | 10-2018-0010989 A | 1/2018 |
| KR | 10-2018-0045840 A | 5/2018 |
| KR | 10-2018-0054382 A | 5/2018 |
| KR | 10-2018-0060997 A | 6/2018 |
| KR | 10-2019-0079367 A | 7/2019 |
| WO | WO 00/11730 A1 | 3/2000 |
| WO | WO 2007/027603 A2 | 3/2007 |
| WO | WO 2016/166972 A1 | 10/2016 |

(56) References Cited

FOREIGN PATENT DOCUMENTS

| WO | WO 2017/132575 | A1 | | 8/2017 | |
|---|---|---|---|---|---|
| WO | WO 2017/203911 | A1 | | 11/2017 | |
| WO | WO 2017/220515 | A1 | | 12/2017 | |
| WO | WO 2018/016816 | A1 | | 1/2018 | |
| WO | WO 2018/062869 | A1 | | 4/2018 | |
| WO | WO 2018/105981 | A1 | | 6/2018 | |
| WO | WO 2018/142809 | A1 | * | 8/2018 | ............. H01M 2/10 |

OTHER PUBLICATIONS

U.S. Office Action dated Jun. 28, 2021, issued in U.S. Appl. No. 16/655,889 (9 pages).
U.S. Final Office Action dated Jun. 29, 2021, issued in U.S. Appl. No. 16/656,324 (15 pages).
U.S. Office Action dated Jul. 7, 2021, issued in U.S. Appl. No. 16/656,099 (9 pages).
EPO Extended Search Report dated Mar. 4, 2020, corresponding to European Patent Application No. 19203926.1 (7 pages).
U.S. Office Action dated Sep. 1, 2021, issued in U.S. Appl. No. 16/656,406 (10 pages).
U.S. Advisory Action dated Sep. 2, 2021, issued in U.S. Appl. No. 16/656,324 (3 pages).
Extended European Search Report for corresponding European Patent Application No. 19203933.7, dated Feb. 20, 2020, 10 pages.
Extended European Search Report for corresponding European Patent Application No. 19203930.3, dated Feb. 24, 2020, 6 pages.
Extended European Search Report for corresponding European Patent Application No. 19203917.0, dated Feb. 24, 2020, 7 pages.
Extended European Search Report for corresponding European Patent Application No. 19203935.2, dated Feb. 24, 2020, 9 pages.
Extended European Search Report for corresponding European Patent Application No. 19203939.4, dated Feb. 28, 2020, 10 pages.
U.S. Office Action dated Oct. 26, 2021, issued in U.S. Appl. No. 16/656,197 (11 pages).
U.S. Notice of Allowance dated Nov. 16, 2021, issued in U.S. Appl. No. 16/656,099 (9 pages).
Chinese Office Action, with English translation, dated Dec. 2, 2021, issued in Chinese Patent Application No. 201910988939.6 (22 pages).
Chinese Office Action, with English translation, dated Dec. 3, 2021, issued in Chinese Patent Application No. 201910989674.1 (23 pages).
Chinese Office Action, with English translation, dated Dec. 21, 2021, issued in Chinese Patent Application No. 201910989914.8 (18 pages).
Chinese Office Action, with English translation, dated Dec. 23, 2021, issued in Chinese Patent Application No. 201910990468.2 (15 pages).
Chinese Office Action, with English translation, dated Dec. 24, 2021, issued in corresponding Chinese Patent Application No. 201910988354.4 (21 pages).
Chinese Office Action, with English translation, dated Dec. 28, 2021, issued in Chinese Patent Application No. 201910989841.2 (16 pages).
U.S. Notice of Allowance dated Jan. 10, 2022, issued in U.S. Appl. No. 16/656,324 (8 pages).
U.S. Final Office Action dated Dec. 17, 2021, issued in U.S. Appl. No. 16/655,889 (8 pages).
U.S. Advisory Action from U.S. Appl. No. 16/655,889, dated Feb. 10, 2022, 3 pages.
U.S. Notice of Allowance from U.S. Appl. No. 16/656,099, dated Mar. 9, 2022, 9 pages.
U.S. Office Action from U.S. Appl. No. 16/656,406, dated Feb. 25, 2022, 9 pages.
U.S. Notice of Allowance dated Jul. 20, 2022, issued in U.S. Appl. No. 16/656,324 (11 pages).
U.S. Notice of Allowance dated Jul. 25, 2022, issued in U.S. Appl. No. 16/656,099 (9 pages).
Chinese Notice of Allowance, with English translation, dated Jul. 25, 2022, issued in Chinese Patent Application No. 201910988354.4 (6 pages).
Chinese Office Action, with English translation, dated Jul. 22, 2022, issued in Chinese Patent Application No. 201910989674.1 (19 pages).
EPO Office Action dated Jul. 26, 2022, issued in European Patent Application No. 19203930.3 (5 pages).
Chinese Office Action dated Jun. 15, 2022, issued in Chinese Patent Application No. 201910988939.6 (9 pages).
Chinese Notice of Allowance dated Jun. 15, 2022, issued in Chinese Patent. Application No. 201910989841.2 (7 pages).
U.S. Notice of Allowance dated Jun. 28, 2022, issued in U.S. Appl. No. 16/656,324 (7 pages).
U.S. Notice of Allowance from U.S. Appl. No. 16/655,889, dated Apr. 18, 2022, 8 pages.
U.S. Notice of Allowance from U.S. Appl. No. 16/656,324, dated May 4, 2022, 11 pages.
U.S. Office Action from U.S. Appl. No. 16/656,197, dated Apr. 27, 2022, 20 pages.
U.S. Office Action from U.S. Appl. No. 16/656,406, dated May 4, 2022, 9 pages.
U.S. Notice of Allowance dated Aug. 11, 2022, issued in U.S. Appl. No. 16/655,889 (8 pages).
U.S. Notice of Allowance dated Aug. 17, 2022, issued in U.S. Appl. No. 16/656,406 (5 pages).
Chinese Office Acton, with English translation, dated Aug. 3, 2022, issued in Chinese Patent Application No. 201910990468.2 (27 pages).
EPO Office Action dated Aug. 5, 2022, issued in European Patent Application No. 19203939.4 (4 pages).
EPO Office Action dated Sep. 1, 2022, issued in European Patent Application No. 19203935.2 (4 pages).
U.S. Office Action dated Sep. 29, 2022, issued in U.S. Appl. No. 16/656,197 (14 pages).
Chinese Notice of Allowance, with English translation, dated Nov. 4, 2022, issued in Chinese Patent Application No. 201910990468.2 (6 pages).
U.S. Office Action dated Feb. 7, 2023, issued in U.S. Appl. No. 16/655,889 (8 pages).
U.S. Notice of Allowance dated Nov. 22, 2022, issued in U.S. Appl. No. 16/656,099 (9 pages).
U.S. Notice of Allowance dated Dec. 7, 2022, issued in U.S. Appl. No. 16/656,406 (5 pages).
U.S. Notice of Allowance dated Dec. 7, 2022, issued in U.S. Appl. No. 16/656,324 (8 pages).
U.S. Final Office Action dated Mar. 23, 2023, issued in U.S. Appl. No. 16/656,197 (13 pages).
EPO Extended European Search Report dated May 2, 2023, issued in European Patent Application No. 23150872.2 (7 pages).
U.S. Office Action dated Jul. 11, 2023, issued in U.S. Appl. No. 18/184,637 (6 pages).
Chinese Notice of Allowance, with English translation, dated Jul. 10, 2023, issued in Chinese Patent Application No. 201910989674.1 (9 pages).

* cited by examiner

BATTERY MODULE

CROSS-REFERENCE TO RELATED APPLICATIONS

This application claims priority to and the benefit of Korean Patent Application No. 10-2018-0125553 filed in the Korean Intellectual Property Office on Oct. 19, 2018, the entire contents of which are incorporated herein by reference, and incorporates, in their entirety, by reference U.S. patent application Ser. No. 16/656,197, U.S. patent application Ser. No. 16/656,324, U.S. patent application Ser. No. 16/655,889, and U.S. patent application Ser. No. 16/656,099, and U.S. patent application Ser. No. 16/656,406, filed on even date herewith.

BACKGROUND

1. Field

The present invention relates to a battery module.

2. Description of the Related Art

A rechargeable or secondary battery is different from a primary battery in that the secondary battery is configured to be charged and discharged repeatedly, and the primary battery is configured to provide only irreversible conversion from a chemical material to electric energy. A low-capacity rechargeable battery may be used as a power source of a small electronic device, such as a mobile phone, a notebook computer, a computer, and a camcorder, and a large-capacity rechargeable battery may be used as a power source of a hybrid vehicle and the like.

The secondary battery may include a positive electrode, a negative electrode, an electrode assembly including a separator interposed between the positive electrode and the negative electrode, a case accommodating the electrode assembly, and an electrode terminal electrically connected with the electrode assembly.

An electrolyte solution is injected into the case so as to enable a battery to be chargeable and rechargeable by an electrochemical reaction of the positive electrode, the negative electrode, and the electrolyte solution. For example, a shape of the case, which may have a cylindrical shape or a rectangular shape, may be different according to usage of the battery.

A rechargeable battery is used in the form of a cell stack formed of a plurality of unit cells which are combined in series or in parallel, and may provide, for example, high energy density for travelling of a hybrid vehicle.

A power amount required by an electric vehicle (EV), a hybrid electric vehicle (HEV), and other electric energy consuming devices has increased according to the development of technology, and in order to satisfy the required power amount, a plurality of battery modules may be provided.

Accordingly, there is a desire to develop a new module structure including a plurality of cell stacks, which may meet power demands of an electric energy consuming device, to simplify component parts, to reduce manufacturing cost and weight, and to make a manufacturing process more efficient.

The above information disclosed in this Background section is only for enhancement of understanding of the background of the invention and therefore it may contain information that does not form the prior art.

SUMMARY

Embodiments of the present invention provide a battery module (e.g., a large module of a battery), which is capable of effectively improving a power amount, simplifying component parts, and efficiently improving a manufacturing process.

A battery module according to an exemplary embodiment of the present invention includes: a plurality of cell stacks, each of the cell stacks including: a plurality of unit cells arranged in a first direction; and an insulation member around the plurality of unit cells; and a module housing, in which a plurality of receiving parts are provided, ones of the cell stacks from among the plurality of cell stacks being located in a receiving part from among the plurality of receiving parts, wherein each of the receiving parts includes a fixing wall, the fixing wall being around the cell stack received therein and being in contact with the cell stack, and wherein the module housing includes end walls at respective sides of each of the receiving parts in the first direction to engage end surfaces of respective sides of the cell stack received in the respective receiving part in the first direction.

The module housing may further include a separation wall that extends in the first direction and partitions an inner space surrounded by an outer wall of the module housing to form adjacent ones of the plurality of receiving parts along a second direction that is perpendicular to the first direction, and the separation wall may correspond to a part of the fixing wall of the adjacent ones of the plurality of receiving parts, and the separation wall may contact a side surface of the respective cell stacks received in the adjacent ones of the plurality of receiving parts.

The end walls may include a first end wall and a second end wall, and the first end wall may face the outer wall of the module housing and may be spaced apart from the outer wall along the first direction, defining a first space between the first end wall and the outer wall.

A first receiving part and a second receiving part from among the plurality of receiving parts may be arranged along the first direction in the inner space of the module housing, and the second end walls of the first receiving part and the second receiving part may be spaced apart from each other and face each other, defining a second space between the second end walls of the first and second receiving parts.

The end walls may be curved outwardly such that central portions thereof may be located further from the end surfaces of the cell stacks than other portions of the end walls, defining a third space between the respective end surface and the respective end wall.

Each of the cell stacks may further include a pair of end supports at opposite end portions thereof in the first direction and having outer side surfaces corresponding to the end surfaces.

The end surfaces may be recessed inwardly so that the central portions thereof are further from the end wall than other portions of the respective end surface.

An inner surface of the end wall may contact the respective cell stack, and an outer surface of the end wall may include a plurality of first ribs.

The plurality of first ribs may extend in a third direction of the end wall and may be spaced apart from each other in the second direction.

The end support may include a plurality of second ribs that protrude toward the end wall from the end surface.

The plurality of second ribs may be spaced apart from each other in a third direction of the end support in a lattice shape.

The separation wall, the end walls, and the outer wall may be integral with a floor surface of the module housing.

The battery module may include a cooling channel under a floor surface of the module housing, the cooling channel being configured to accommodate a flow of coolant.

Lateral walls of the cooling channel may be integral with the floor surface of the module housing.

The module housing may further include coupling parts that are configured to be coupled to the coupling parts of an adjacent module housing.

The coupling parts may be at a first outer wall and a second outer wall from among the outer walls of the module housing in a second direction, and the coupling part at the second outer wall of the module housing may be configured to be coupled to a coupling part at a first outer wall of the adjacent module housing.

According to exemplary embodiments of the present invention, it is possible to effectively improve electric energy, simplify components, and efficiently improve a manufacturing process of a battery module.

DETAILED DESCRIPTION

Figure 1:
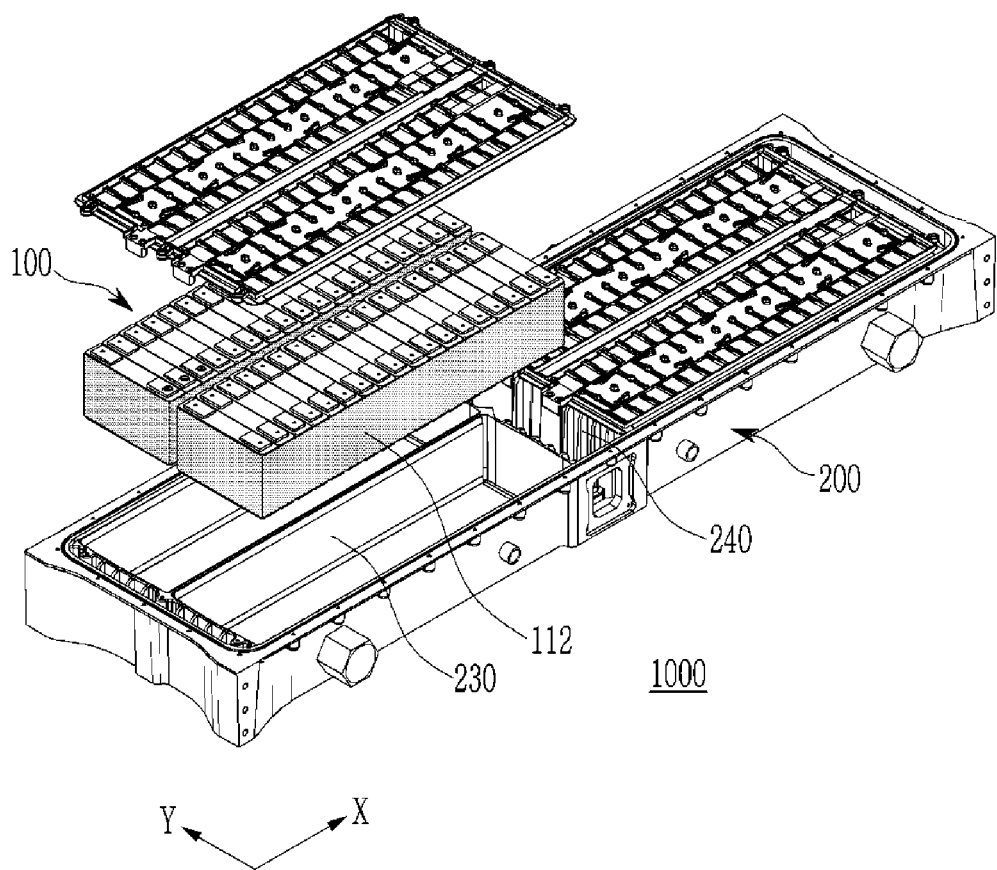
FIG. 1 is a partially exploded perspective view illustrating a battery module according to an exemplary embodiment of the present invention.

In the following detailed description, only certain exemplary embodiments of the present invention are shown and described, simply by way of illustration. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

As those skilled in the art would realize, the described embodiments may be modified in various different ways, all without departing from the spirit or scope of the present invention. Accordingly, the drawings and description are to be regarded as illustrative in nature and not restrictive. In the drawings, the relative sizes of elements, layers, and regions may be exaggerated for clarity. Unless otherwise noted, like reference numerals designate like elements throughout the attached drawings and the written description, and thus, descriptions thereof may not be repeated.

It will be understood that, although the terms "first," "second," "third," etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, in the present specification, it should be understood that when one constituent element referred to as being "on," "coupled to," or "connected to" another constituent element, one constituent element can be directly on, coupled to, or connected to the other constituent element, or one or more intervening elements may also be present. In contrast, when one constituent element is described as being "directly on," "directly coupled to," or "directly connected to" another constituent element, it should be understood that there are no intervening element present. In addition, it will also be understood that when an element or layer is referred to as being "between" two elements or layers, it can be the only element or layer between the two elements or layers, or one or more intervening elements or layers may also be present.

Further, terms used in the present specification are used for simply explaining a specific exemplary embodiment, and are not used for intending to limit the present invention. Singular expressions used herein include plurals expressions unless the context clearly indicates otherwise.

Further, in the present specification, it will be appreciated that the terms "comprises," "comprising," "includes," "including," "has," and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof.

Further, in the present specification, the term "and/or" includes a combination of a plurality of described items or any item among the plurality of described items. In the present specification, "A or B" may include "A", "B", or "both A and B". Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
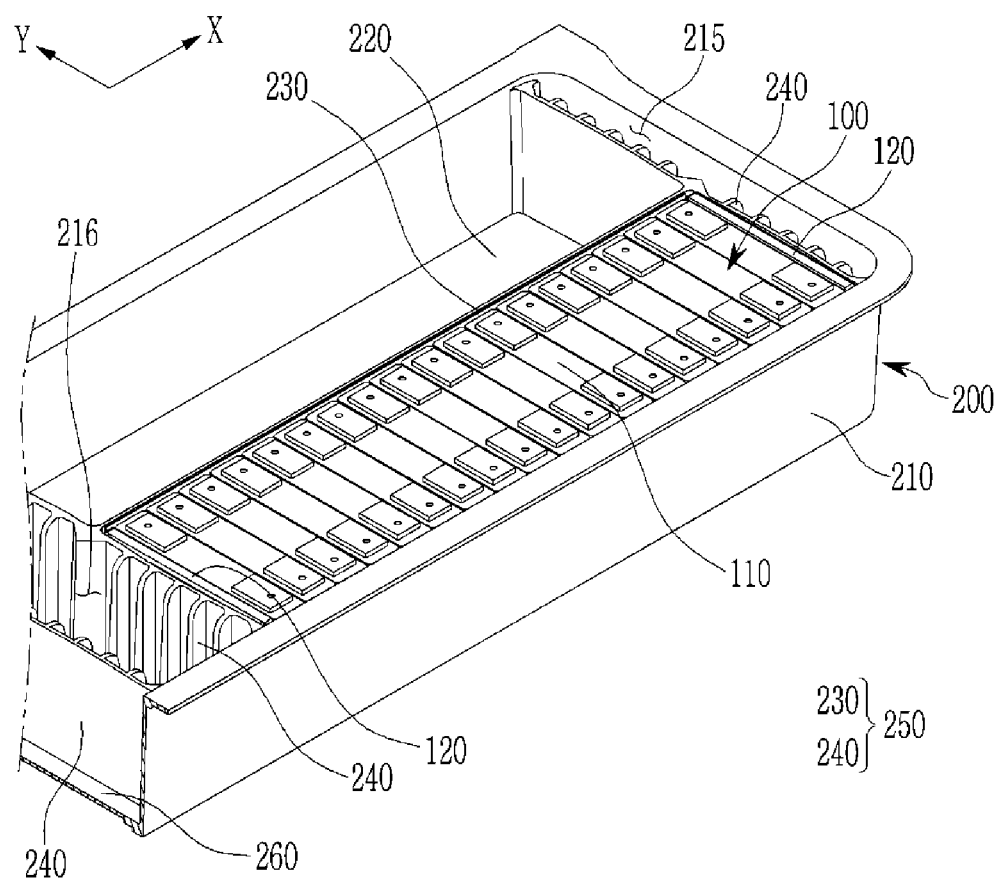
FIG. 2 is a perspective view illustrating a portion of a receiving part in the battery module according to the exemplary embodiment of the present invention.

FIG. 1 illustrates a battery module (e.g., a large module of a battery) 1000 according to an exemplary embodiment of the present invention, and FIG. 2 illustrates a receiving part (e.g., a receiving unit) 220 in the battery module 1000 illustrated in FIG. 1.

As illustrated in FIGS. 1 and 2, the battery module 1000 according to the exemplary embodiment of the present invention includes a cell stack 100 and a module housing 200. The cell stack 100 may include a plurality of unit cells 110 arranged in (or along) a first direction X and an insulation member 112 around (or surrounding) the plurality of unit cells 110. The module housing 200 may include a plurality of receiving parts 220 into which the cell stacks 100 are inserted. The receiving part 220 may include a fixing wall 250 around (or surrounding) the cell stack 100 and at least a part (or a portion) of which is in contact with the cell stack 100.

The cell stack 100 includes the plurality of unit cells 110 arranged (or stacked) in the first direction X. The unit cells 110 each correspond to one secondary battery including an electrode assembly and provided with a terminal unit, and may each have a case having any suitable shape, such as a square shape or a cylindrical shape.

In FIGS. 1 and 2, the unit cells 110 each have a rectangular pillar-shaped case, but the present invention is not limited thereto or thereby, and the unit cells 110 may have any suitable shape. Hereinafter, for convenience of description, the unit cells 110 are described as each having a rectangular-shaped case, as illustrated in FIGS. 1 and 2.

In the cell stack 100, the plurality of unit cells 110 may be arranged in (e.g., along) any suitable arrangement direction, but in some embodiments, the plurality of unit cells 110 may be arranged in (or along) a direction in which wider lateral surfaces among the lateral surfaces of the unit cells 110 face each other, as illustrated in FIGS. 1 and 2. Hereinafter, the arrangement direction of the unit cells 110 is defined as the first direction X. The unit cells 110 or end supports 120 may be disposed at both ends of the cell stack 100 in the first direction X.

The number of unit cells 110 configuring the cell stack 100 may be varied as necessary or desired. The unit cells 110 included in one cell stack 100 may be electrically connected with each other by using a bus bar, which can have any suitable shape.

The cell stack 100 may include the insulation member 112 around (or surrounding) the plurality of unit cells 110. The insulation member 112 may be formed of an insulating material, such as rubber or plastic, and is located around (or surrounds) the plurality of unit cells 110.

The insulation member 112 may also be provided around (or to surround) the end supports 120 disposed at both ends of the cell stack 100 in the first direction X together with the plurality of unit cells 110, or may be around (or surround) only the plurality of unit cells 110 (and not the end supports 120), and the end supports 120 may also be separately disposed at both ends of the cell stack 100.

The insulation member 112 may be provided in the form of a film, or a plurality of configurations shaped like a plate having hardness may be provided in the insulation member 112, for example. The insulation member 112 may be around (or surround) all four lateral surfaces of the cell stack 100, or may be disposed at some of the four lateral surfaces, and may also be provided so as to be around (or surround) both an upper surface and a lower surface of the cell stack 100. However, the insulation member 112 disposed on the upper surface of the cell stack 100 may be provided so as to expose the terminal unit of each unit cell 110.

FIG. 1 illustrates an embodiment where the insulation member 112 is prepared in the form of an insulation film around (or that surrounds) the lateral surfaces of the plurality of unit cells 110, and is not around (or does not surround) the end supports 120, in the cell stack 100 according to the exemplary embodiment of the present invention.

The module housing 200 includes a plurality of receiving parts 220, into which the cell stacks 100 are inserted (or received). FIG. 1 illustrates an embodiment where four receiving parts 220 are formed in the module housing 200, and in FIG. 2, two receiving parts 220 are separately illustrated in the module housing 200. According to embodiments of the present invention, any suitable number of receiving parts 220 may be provided in the module housing 200.

The module housing 200 includes an outer wall 210, which protrudes from a floor surface 260 in an upper direction (e.g., a third direction) and surrounds (or is around) the floor surface 260. An internal space is defined at an inner side of the outer wall 210. The plurality of receiving parts 220 may be provided in the internal space.

The module housing 200 may have any suitable shape, for example, the module housing 200 according to the exemplary embodiment of the present invention may be provided so as to have the floor surface 260 having an approximately quadrangular shape, as illustrated in FIGS. 1 and 2.

An upper portion of the module housing 200 may be open, and thus the receiving part 220 provided in the module housing 200 may also have an upper portion of the receiving part 220 that is open. A module cover may be coupled to the open upper surface of the module housing 200, so that the module housing 200 may be sealed, and when the module cover is coupled with the module housing 200, the module cover corresponds to the upper surface of the receiving part 220.

FIGS. 1 and 2 illustrate the receiving part 220 according to the exemplary embodiment of the present invention. The receiving part 220 includes the fixing wall 250 which is around (or surrounds) the cell stack 100 and of which at least a part is in contact with the cell stack 100.

FIG. 1 illustrates an embodiment where the receiving part 220 (e.g., a first receiving part 220), into which the cell stack 100 is inserted, and the receiving part 220 (e.g., a second receiving part 220), into which the cell stack 100 is not inserted, are disposed in parallel. The fixing wall 250 corresponds to a boundary wall around (or surrounding) an area of the receiving part 220, and the cell stack 100 inserted into the receiving part 220 stably maintains a fixed state with the fixing wall 250 around (or surrounding) the cell stack 100 on four sides.

The fixing wall 250 may be variously disposed according to the form of the cell stack 100, but as illustrated in FIG. 1, the fixing wall 250 may have four surfaces, which support four-directional lateral surfaces of the cell stack 100 while facing the four-directional lateral surfaces, respectively, and be disposed around (or to surround) the cell stack 100.

At least a part of the fixing wall 250 of the receiving part 220 is in direct contact with the cell stack 100. For example, any one surface of the fixing wall 250 positioned in the first direction X may also be in direct contact with the cell stack 100, and any one surface of the fixing wall 250 positioned in a second direction Y perpendicular to the first direction X may also be in direct contact with the lateral surfaces of the plurality of unit cells 110, for example, the insulation member 112.

The second direction Y may be defined as a direction perpendicular to the first direction X on the same plane as that of the first direction X, and may be defined as a width direction of the unit cell 110, as illustrated in FIG. 1.

As described above, in the exemplary embodiment of the present invention, the cell stack 100 may maintain the shape by the fixing wall 250 even without a separate component, and may maintain an engaged state (e.g., a pressed state) in the first direction X.

In a general battery module (i.e., not the battery module 1000 according to embodiments of the present invention), a module frame is coupled to one cell stack and one cell stack, which is coupled with the module frame and is treated as a unit configuration, configures one module.

Unlike the cell stack according to the present invention, the generally treated cell stack may be coupled with a module frame for a performance aspect, such as energy density and ease of treatment, and the module frame may be formed of end blocks pressing both ends of the cell stack with side plates extended along side surfaces of the cell stack, and the like, and the end blocks and the side plates may be coupled with each other such that the cell stack is pressed to maintain the structure of the cell stack.

Unlike the battery module 1000 according to the present invention, in a general battery module, the cell stack coupled with the module frame is inserted and the module housing is fastened to the module frame, and the general battery module has the power amount provided by one cell stack.

In the case of the general battery module, a plurality of battery modules needs to be provided so as to meet higher power demanded than that of one cell stack, and thus, a module frame fastening the cell units into a unit body and a plurality of components configuring a module itself are additionally required.

Therefore, a process for manufacturing the general battery module may be increased, the consumption for the components may be increased, a weight of the general battery module may be increased, and the time and cost required for manufacturing the general battery module may be increased.

In the battery module 1000 according to the exemplary embodiment of the present invention, the plurality of cell stacks 100 is mounted to one module, unlike the general battery module, which is thus advantageous to meet the high power demanded, and the cell stack 100 is fixed by the fixing wall 250 of the receiving part 220, of which at least a part is differentiated from the outer wall 210 of the module housing 200, so that a component (e.g., a module frame) for fixing the cell stack 100 is not separately needed (or demanded).

For example, as shown in FIG. 1 and FIG. 2, in the exemplary embodiment of the present invention, a plurality of receiving parts 220 are provided in one module housing 200, and the fixing wall 250 around (or that surrounds) the receiving part 220 is provided to fix each cell stack 100 while being around (or surrounding) the same, unlike the outer wall of the module housing 200.

As shown in FIG. 1 and FIG. 2, the module housing 200 according to the exemplary embodiment of the present invention may further include end walls 240 that extend in the second direction Y and may be disposed at both ends of each of the plurality of receiving parts 220 in the first direction X to each engage (e.g., to press) the end surfaces of both sides of the cell stack 100, and the end wall 240 may correspond to a part of the fixing wall 250.

In the present exemplary embodiment, the side surfaces of both ends of the cell stack 100 in the first direction X are defined as the end surfaces, respectively. According to an exemplary embodiment of the present invention, the end surface may correspond to the insulating member 112 or one surface of the end support 120.

FIGS. 1 and 2 illustrate a configuration in which the end walls 240 are disposed at both sides of the cell stack 100 in the first direction X. A plurality of end walls 240 may exist in the module housing 200 and may correspond to both sides of the fixing wall 250 of the receiving part 220 in the first direction X.

The end wall 240 may be distinguished from the outer wall 210 of the module housing 200. For example, the end wall 240 has a shape protruding from the floor surface 260 in the inner space of the module housing 200 and extends in the second direction Y. The end walls 240 may include a first end wall 240 and a second end wall 240. The first end walls 240 may be disposed so as to be spaced apart from the outer wall 210 facing one surface, and the second end walls 240 may face each other, as discussed further below.

FIG. 1 illustrates an embodiment including a plurality of receiving parts 220, for example a total of four receiving parts 220, with two in the first direction X and two in the second direction Y, and one separation wall 230 that crosses a portion of the inner space of the module housing 200 in the first direction X and four end walls 240 extending in the second direction Y.

The separation wall 230 is shared by the receiving parts 220 adjacent to each other (or stacked) in the second direction Y, but the end walls 240 are not shared by adjacent receiving parts 220 stacked in the first direction X. Instead, respective end walls 240 (e.g., the second end walls 240) are disposed to be spaced apart from each other and to face each other at ends of the two receiving parts 220 that face each other in the first direction X.

For example, the end wall 240 may be disposed such that one side (e.g., a first side) of the end wall 240 contacts the end surface of the cell stack 100 that is inserted into the corresponding receiving part 220 and the other side thereof (e.g., a second side) is disposed apart from the outer wall 210 and faces the outer wall 210 or an end wall 240 of another receiving part 220 that is disposed in parallel in the first direction X.

At least a part of each of the end walls 240 disposed at opposite sides of the receiving part 220 in the first direction X is in direct contact with the facing end surface of the cell stack 100, for example, one surface of the end support 120. Further, the end wall 240 may be disposed to engage (e.g., to press) the cell stack 100 in the first direction X.

As described above, in the exemplary embodiment of the present invention, the cell stack 100 inserted into the receiving part 220 is not fastened with a module frame, such as an end block or a side plate, but the insulation member 112 may be around the lateral surfaces of the cell stack 100 where the plurality of unit cells 110 is arranged (or simply arranged), and in the battery module 1000 according to the exemplary embodiment of the present invention, the end wall 240 may serve to engage (e.g., to press) and fix the cell stack 100 in the first direction X.

The cell stack 100 is engaged (e.g., pressed) in the first direction X to provide higher power under the same volume, and may be maintained in a structurally stable state.

The cell stack 100 may be inserted between the fixing walls 250 of the receiving part 220, e.g., between the pair of end walls 240 provided at both sides in the first direction X in the state of engaging (e.g., pressing) the end surfaces and being pressed through a jig inserted into the receiving part 220, and may maintain a pressed state by the pair of end walls 240.

As shown in FIG. 2, the module housing 200 may further include the separation wall 230 that extends in the first direction X, and partitions the inner space surrounded by the outer wall 210 to contribute to form the plurality of receiving parts 220, and the separation wall 230 may configure (or form) a portion of the fixing walls 250 of the two receiving parts 220 disposed at both sides along the second direction Y, and may be in contact with the side surfaces of the cell stack 100 inserted into each of the two receiving parts 220.

The side surfaces refer to both side surfaces extending in the first direction X among the side surfaces of the cell stack, and as described above, because the cell stack 100 according to the present invention does not include the separate module frame, the side surfaces may correspond to the insulating member 112 surrounding the side surfaces of the plurality of unit cells 110.

The separation wall 230 may protrude upwardly from the floor surface 260 of the module housing 200, and may be provided to divide the inner space of the module housing 200 while extending along the first direction X. For example, the separation wall 230 may correspond to a portion of the fixing wall 250 surrounding the receiving part 220, e.g., one surface thereof.

Referring to FIGS. 1 and 2, the receiving parts 220 may be formed at both sides of the separation wall 230, and the separation wall 230 becomes (or forms) the fixing wall 250 for the two receiving parts 220 formed at both sides thereof.

Referring to FIG. 2, the separation wall 230 faces the side surfaces of the cell stack 100 inserted into the receiving part 220, and accordingly, the separation wall 230 corresponding to a portion of the fixing wall 250 is in direct contact with at least a portion of the side surfaces of the cell stack 100 inserted into the receiving part 220 to thereby support the cell stack 100 in the second direction Y.

Figure 3:
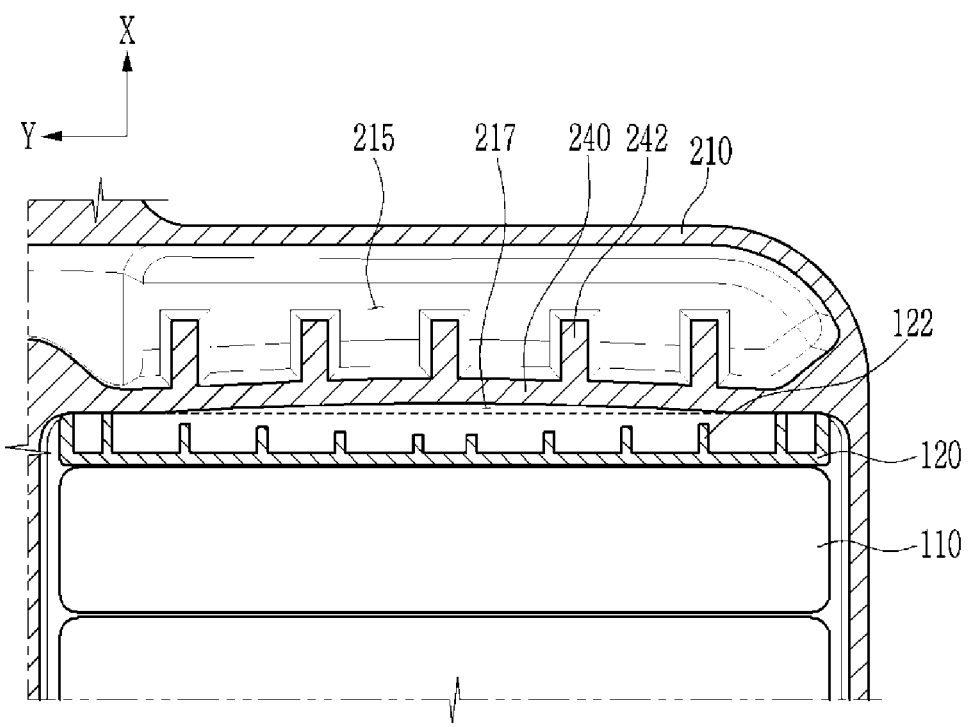
FIG. 3 is a cross-sectional view of a portion of an end wall and an end support in the battery module according to the exemplary embodiment of the present invention.

As illustrated in FIG. 2 and FIG. 3, a part (or a portion) of the plurality of end walls 240 is provided at a distance from the outer wall 210 of the module housing 200 (or the first end walls 240 are spaced from the outer wall 210 of the module housing 200).

In the exemplary embodiment of the present invention, the first end wall 240, which is disposed so that a surface thereof (e.g., a surface of the second side thereof) faces the outer wall 210 of the module housing 200, may be spaced apart from the outer wall 210 in the first direction X to form a first space (e.g., a first impact absorption space) 215 between the first end wall 240 and the outer wall 210, as illustrated in FIGS. 1-3.

FIG. 2 and FIG. 3 illustrate the receiving part 220 (e.g., the fixing wall 250, or the first end wall 240) facing the outer wall 210 of the module housing 200, and illustrate the first space 215 formed between the first end wall 240 and the outer wall 210.

The module housing 200 protects (or safely protects) the cell stack 100 inserted into the receiving part 220 against an impact transferred from outside of the module housing 200, and in the exemplary embodiment of the present invention, the first end wall 240, which is in direct contact with the end surface of the cell stack 100 and supports and engages (e.g., presses) the cell stack 100, is spaced apart from the outer wall 210, thereby preventing the impact transferred to the outer wall 210 from being directly transferred to the first end wall 240, or reducing the likelihood thereof.

Further, safety of the battery can be improved because the impact transmitted from outside the module housing 200 by the first space 215 is transmitted to the first end wall 240 and the cell stack 100 in a reduced state.

Further, it is desired to appropriately cool the unit cell 110 from heating when the unit cell 110 is utilized, and the first space 215 may provide (or advantageously serve as) a heat radiating space, in which heat of the cell stack 100 is dispersed.

In the exemplary embodiment of the present invention, as illustrated in FIGS. 1 and 2, two receiving parts 220 are disposed in the internal space of the module housing 200 in the first direction X, and the two receiving parts 220 adjacent to each other in the first direction X each include one of the end walls 240 which face each other in the first direction X (e.g., the second end walls 240) and are spaced apart from each other in the first direction X to form a second space (e.g., a second impact absorption space) 216 between the second end walls 240.

As illustrated in FIG. 1, in some embodiments, the module housing 200 includes four receiving parts 220, and sets of two receiving parts 220 are aligned (or arranged) along the first direction X. However, the present invention is not limited thereto, and any suitable number of receiving parts 220 may be aligned (or arranged) along the first direction X.

In each of the two receiving parts 220 adjacent to each other in the first direction X, the fixing wall 250 (or the end wall 240) of one receiving part 220 faces the fixing wall 250 (or the end wall 240) of the other receiving part 220, and the two receiving parts 220 have different end walls 240 that face each other (e.g., different second end walls 240 that face each other). For example, the receiving parts 220 arranged in the first direction X do not share the end wall 240.

Referring to FIG. 2, in some embodiments, the two receiving parts 220 may be arranged in the first direction X, and the second end walls 240 may be spaced apart from each other, and the second space 216 may be formed between the second end walls 240.

The second space 216 protects the cell stack 100 inserted into the corresponding receiving part 220 from an impact transferred from the outside of the receiving part 220, much like the first space 215. For example, the first space 215 may suppress an impact transferred from the outer wall 210 of the module housing 200 from being transferred to the internal space of the module housing 200, and the second space 216 may suppress the impact transferred to any one receiving part 220 (or the first receiving part 220) from being transferred to the receiving part 220 adjacent to the first receiving part 220 (or the second receiving part 220) in the first direction X.

Figure 4:
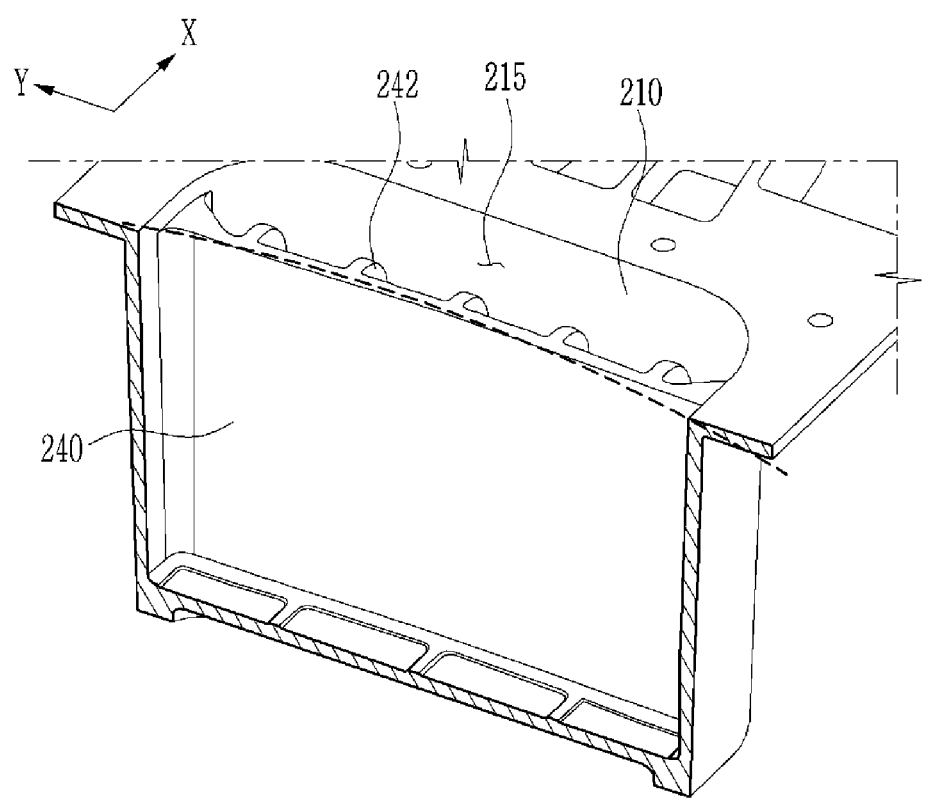
FIG. 4 is a cross-sectional perspective view of the end wall in the battery module according to the exemplary embodiment of the present invention.

FIG. 3 illustrates the end wall 240, which is bent (or curved) so that a central portion of the end wall 240 is spaced further from the end surface of the cell stack 100, and FIG. 4 illustrates an inner surface of the end surface of the cell stack 100 at the bent end wall 240.

As shown in FIG. 3 and FIG. 4, in the battery module 1000 according to the exemplary embodiment of the present invention, the end wall 240 may be bent (or curved) to the outside (or toward the outer wall 210) so that a center (or central) portion of the end wall 240 is further from the facing (or adjacent) end surface of the cell stack 100, so that a third space (e.g., a swelling space) 217 may be formed between the end wall 240 and the end surface.

The end wall 240 may be bent (or curved) so that the center portion of the end wall 240 is further from the end surface of the cell stack 100 inserted into the receiving part 220. In some embodiments, only the center portion may be concavely indented in the second direction Y and in the third direction, but the end wall 240 may be bent so that a cross-section of the end wall 240 is curved, as illustrated in FIG. 3.

The end wall 240 has the bent (or curved) shape, so that a space is formed at least at (or in) the center portion between the end wall 240 and the end surface of the cell stack 100, and the corresponding space is referred to as the third space 217 in the exemplary embodiment of the present invention.

In the unit cell(s) 110 that form the cell stack 100, a swelling phenomenon, in which gas is generated from the internal electrode assembly and is expanded, may be generated according to deterioration of durability by use (e.g., repeated use) and a peripheral situation (e.g., by swelling of an adjacent unit cell 110), and the implementation of the structure, which is capable of appropriately treating (or accounting for) the swelling, is particularly important in arranging the plurality of unit cells 110.

For example, when swelling occurs in any one of the unit cells 110, other unit cells 110 of the cell stack 100 that includes the corresponding unit cell 110 may possibly experience the swelling, and when the swelling occurs in one unit cell 110 among the entire unit cells 110 and thus a thickness is increased, the entire length of the cell stack 100 may be greatly affected. Further, the length change of the cell stack 100 may affect the end wall 240 that engages (e.g., presses) the cell stack 100 in the first direction X such that damage and the like may be caused.

When the swelling phenomenon occurs, the unit cells 110 have a large amount of expansion of the central portion on the side surface positioned in the first direction X due to structural characteristics thereof, and accordingly, in an exemplary embodiment of the present invention, the third space 217 is formed between the end wall 240 and the end surface so as to accommodate a volume expansion of the cell stack 100 due to swelling when the swelling phenomenon of the cell stack 100 occurs, for example.

As described above, the cell stack 100 is engaged (e.g., pressed) in the first direction X for efficiency (such as energy density and the like), and in an exemplary embodiment of the present invention, even though the central portion of the end wall 240 engaging (e.g., pressing) the end surface is curved, because at least the both end sides of the end wall 240 in the second direction Y maintain an engaged (e.g., pressed) state of the end surface of the cell stack 100, the cell stack 100 is properly operated.

Figure 5:
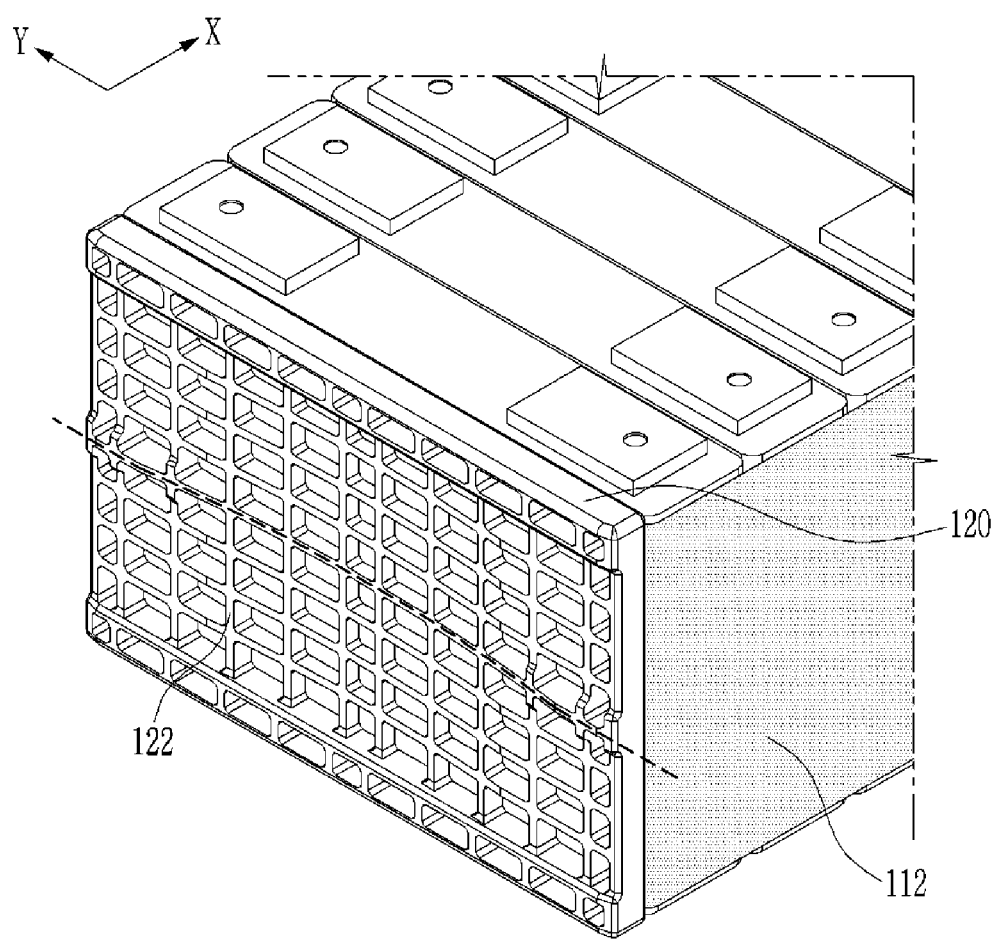
FIG. 5 is a perspective view of an end surface of the end support in the battery module according to the exemplary embodiment of the present invention.

FIG. 3 illustrates that the end support 120 is disposed at an outer side of the outermost cell of the cell stack 100, and FIG. 5 shows an end surface (or an outer surface) of the end support 120.

As illustrated in FIGS. 3 and 5, in the battery module 1000 according to the exemplary embodiment of the present invention, the cell stack 100 may further include one pair of the end supports 120 disposed at both (or opposite) end portions in the first direction X and of which an outer surface corresponds to the end surface of the cell stack 100.

According to an exemplary embodiment of the present invention, the plurality of unit cells 110 may be provided such that at least the lateral surface is surrounded by the insulation member 112 (or the insulation member 112 is around at least the lateral surface of plurality of unit cells 110), and the end supports 120 may be disposed such that an inner surface of each of the end supports 120 is in surface contact with the insulation member 112, at both ends of the cell stack 100 in the first direction X. However, the present invention is not limited thereto.

The end supports 120 are disposed at both ends of the cell stack 100 in the first direction X, and outer surfaces of the end supports 120 may correspond to end surfaces of the cell stack 100. The end support 120 may serve to absorb impact between the end wall 240 and the plurality of unit cells 110, and may serve to uniformly transfer force (e.g., pressing force) of the end wall 240 to the outermost cell among the plurality of unit cells 110.

The outermost cell refers to the unit cell 110 positioned at the outermost side in the first direction X among the plurality of unit cells 110 configuring the cell stack 100, and in the exemplary embodiment of the present invention, the outermost cell is disposed at each end of the cell stack 100 in the first direction X.

Even though an entire surface of the end wall 240 may not press the end support 120 (e.g., because the end wall 240 has the bent shape), an entire surface of the end support 120 may press the insulation member 112 and the outer surface of the outermost cell.

As shown in FIG. 5, the end surface of the end support 120 may be concavely indented such that a center portion of the end surface of the end support 120 may be away from the facing end wall 240. For example, the end support 120 may have a shape in which a center portion of the end surface of the end support 120 is concave.

When the end support 120 is provided, the end surface of the end support 120 may be shaped such that the center portion of the end surface is indented, so that a space is formed in at least the center portion between the end surface of the end support 120 and the end wall 240 similar to the end wall 240 having the bent (or curved) shape, and thus the third space 217 may be formed in at least the center portion between the end support 120 and the end wall 240.

For example, swelling may occur in at least one of the plurality of unit cells 110 and thus a center portion of the unit cell 110 expands, and the center portion of the end support 120 presses toward the end wall 240 due to the expansion of the center portion of the plurality of unit cells 110. However, according to embodiments of the invention, the center portion of the end surface of the end support 120 is inwardly concave such that even when the center portion of the end support 120 is pressed to the outside or deformed, deformation or damage to the end wall 240 can be suppressed or prevented, or the likelihood thereof may be reduced, by the third space 217 formed between the end support 120 and the end wall 240.

As shown in FIG. 2 and FIG. 3, a plurality of first ribs 242 may be formed in the end wall 240 according to the exemplary embodiment of the present invention. For example, the end wall 240 may include the plurality of first ribs 242 on the outer surface in the first direction X.

The end wall 240 should be strong against impact from the outside while engaging (e.g., pressing) the end surface of the cell stack 100, and further, even when the third space 217 is formed, the end wall 240 should have mechanical strength, by which the end wall 240 is prevented from being damaged, or the likelihood thereof is reduced.

Accordingly, in the exemplary embodiment of the present invention, as illustrated in FIGS. 2 and 3, the plurality of first ribs 242 may be provided in the outer surface of the end wall 240, e.g., the surface facing the outer wall 210 or a surface opposite to the cell stack 100.

The first ribs 242 are formed on the outer surface of the end wall 240 for protecting the cell stack 100. As used herein, the outer surface of the end wall 240 refers to a surface facing the opposite side of the end support 120. The first ribs 242 may be separately manufactured and may be coupled to the end wall 240, and the first ribs 242 may be integrally formed with the end wall 240 by a cast process.

As illustrated in FIGS. 2 and 3, the plurality of first ribs 242 may be extended in the third direction (e.g., the height direction) of the end wall 240, and may be spaced apart from each other in the second direction Y.

The first ribs 242 may extend in the third direction of the end wall 240, e.g., may extend toward a top side (or upper side) of the module housing 200 from the floor surface 260 of the module housing 200. Accordingly, The first ribs 242 may effectively improve strength of the end wall 240 and may be integrally formed with the end wall 240, e.g., in a cast process using an upper mold and a lower mold.

Further, the first ribs 242 are spaced apart from each other in (or along) the second direction Y, thereby uniformly and stably improving strength for the end wall 240 in its entirety. FIG. 3 illustrates a cross-section of the plurality of first ribs 242 spaced apart from each other in the second direction Y.

FIG. 5 illustrates the end support 120, in which a plurality of second ribs 122 is formed on the end surface of the end support 120. As shown in FIG. 5, in the exemplary embodiment of the present invention, the end support 120 may include the plurality of second ribs 122 that protrude toward the end wall 240 in the end surface of the end support 120.

Swelling force transferred from the plurality of unit cells 110 may be applied to the end support 120 at the time of the generation of swelling. As such, the end support 120 is configured to respond to expansion of the unit cells 110 and to be strong against transformation and damage according to the swelling phenomenon.

Accordingly, the second ribs 122 are formed on the end surface of the end support 120 to improve strength of the end support 120. For example, an inner surface of the end support 120, e.g., the surface opposite to the end surface, is in surface contact with the outermost cell of the cell stack 100 or the insulation member 112 to uniformly secure pressing performance, and the second ribs 122 are formed on the end surface of the end support 120.

Further, as illustrated in FIG. 5, in the exemplary embodiment of the present invention, the second ribs 122 may be spaced apart from each other in the second direction Y and the third direction of the end support 120 so as to form a lattice shape.

Referring to FIG. 5, in the exemplary embodiment of the present invention, the second ribs 122 may be formed to approximately cross the entirety of the end surface in the extension direction, and some of the plurality of second ribs 122 are extended in the second direction Y and the remaining second ribs 122 are extended in the third direction of the end support 120, so that the plurality of second ribs 122 may be disposed to form a lattice form.

For example, the plurality of second ribs 122 may be disposed to be spaced apart from each other in the second direction Y and the third direction of the end support 120 to form a lattice shape, and accordingly robustness of the end support 120 can be effectively improved.

According to embodiments, in the end support 120, the quadrangular recesses may be approximately disposed in the lattice shape on the end surface, and the second ribs 122 may be separately manufactured and coupled to the end surface of the end support 120 or may be integrally formed with the end support 120 when the end support 120 is manufactured.

In the exemplary embodiment of the present invention, the fixing wall 250 of any one receiving part 220 may be defined to include the separation wall 230, one pair of end walls 240, and a part of the outer wall 210, and the separation wall 230 and the end walls 240 may be integrally formed, for example, through a cast process and the like.

Further, as illustrated in FIG. 2, in the exemplary embodiment of the present invention, one surface among the four surfaces of the fixing wall 250 corresponds to the separation wall 230, two other surfaces correspond to the end walls 240, respectively, and one remaining surface may be formed of the outer wall 210 of the module housing 200.

In the battery module 1000 according to the exemplary embodiment of the present invention, the end walls 240, the separation wall 230, and the outer wall 210 may be integrally formed with the floor surface 260 of the module housing 200, e.g., by a cast process.

For example, in the exemplary embodiment of the present invention, the end walls 240 and the separation walls 230 may be integrally formed with the module housing 200, and when a mold is utilized for a manufacturing process (e.g., for the cast process), engraving (or intaglio) of the end walls 240 and the separation wall 230 may be integrally formed in the mold.

Further, in the exemplary embodiment of the present invention, the end walls 240 and the separation wall 230 may also be integrally formed with the outer wall 210 of the module housing 200. For example, in the module housing 200, all of the outer wall 210, the separation wall 230, the end walls 240, and the floor surface 260 may be integrally formed.

As described above, in the module housing 200 to which the end wall 240 and the separation wall 230 are integrally formed, an additional manufacturing process for including the end wall 240 and the separation wall 230 can be omitted, and as previously described, even when a module frame is omitted by the end wall 240 and the separation wall 230, the cell stack 100 can be fixed (e.g., stably fixed) while the plurality of unit cells 110 are in an engaged state (e.g., pressed stated) in the receiving parts 220.

Figure 6:
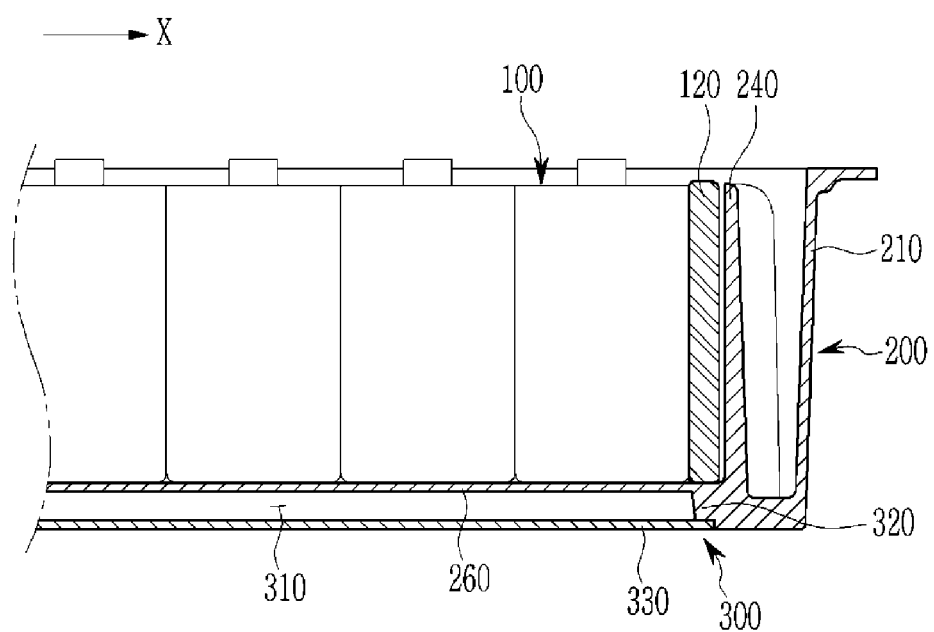
FIG. 6 schematically shows a cooling channel in the battery module according to the exemplary embodiment of the present invention.
Figure 7:
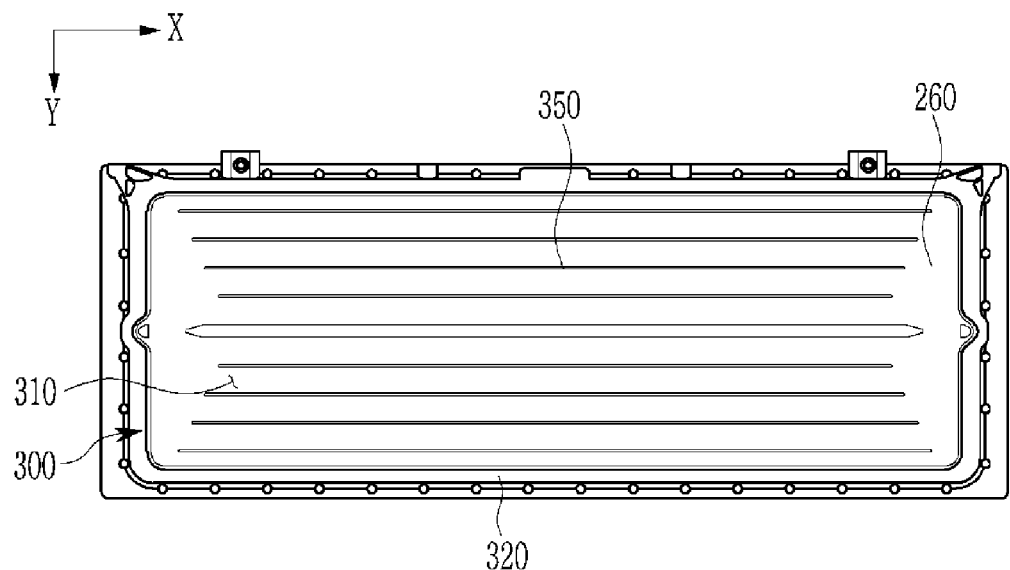
FIG. 7 is a bottom view of the cooling channel in the battery module according to the exemplary embodiment of the present invention.

FIG. 6 illustrates a cross section of the module housing 200 according to an exemplary embodiment of the present invention, and illustrates a cooling channel 300 having a flowing space 310 in which a coolant (e.g., cooling water) flows below the floor surface 260. FIG. 7 illustrates a bottom view of the cooling channel 300.

As shown in FIG. 6, in the battery module 1000 according to an exemplary embodiment of the present invention, the cooling channel 300 through which the coolant flows may be formed below the floor surface 260 of the module housing 200. In addition, a plurality of guide protrusions 350 extending in a flow direction of the coolant and guiding the flow of the coolant may be provided on a lower surface of the floor surface 260, as illustrated in FIG. 7.

The flowing space 310 of the cooling channel 300 may be formed across an entirety of the floor surface 260, or may be formed to correspond to a cross-sectional area of the inner space of the module housing 200 in which the receiving parts 220 are formed. For example, the cooling channel 300 may be designed such that the flowing space 310 of the cooling channel 300 is not formed below the first space 215. The coolant flows through the cooling channel 300, and various suitable refrigerants, such as air, may also be used.

The unit cells 110 constituting the cell stack 100 correspond to heating elements that dissipate heat during discharge, and when the temperature of the unit cells rise excessively, a thermal runaway phenomenon may occur where heat is rapidly increased due to abrupt chemical reaction and fire or the like occurs.

In addition, when the cell stack 100 in which the plurality of unit cells 110 are aligned along the first direction X, when the thermal runaway phenomenon occurs in any one of the unit cells 110, a thermal runaway diffusion phenomenon, which affects other peripheral unit cells 110, may also occur.

As described above, when the plurality of unit cells 110 are arranged along the first direction X, it is important to adequately cool the heat generated in the cell stack 100, and accordingly, the battery module 1000 according to an exemplary embodiment of the present invention efficiently implements the cooling of the plurality of cell stacks 100 by forming the cooling channel 300 below the floor surface 260 of the module housing 200.

In addition, in an exemplary embodiment of the present invention, the maintenance and management of the cooling channel 300 may be more easily performed by forming the cooling channel 300 below the floor surface 260 of the module housing 200 rather than the inside of the module housing 200, e.g., at the inner space and the partitioned space of the module housing 200. For example, in the exemplary embodiment of the present invention, even when a module cover of the module housing 200 is assembled, the maintenance and management of the cooling channel 300 from a lower portion of the module housing 200 can be enabled.

In the battery module 1000 according to the exemplary embodiment of the present invention, lateral wall 320 of the cooling channel 300 may be integrally formed with the floor surface 260 of the module housing 200, e.g., through the cast process.

The lateral wall 320 of the cooling channel 300 may protrude downward from the floor surface 260 around (or while surrounding) the floor surface 260. For example, in the exemplary embodiment of the present invention, the lateral wall 320 of the cooling channel 300 may be integrally formed with the floor surface 260 of the module housing 200, e.g., through the cast process, so that a coupling region between the lateral wall 320 and the floor surface 260 is omitted, and thus it is possible to prevent the coolant from unintentionally leaking into the module housing 200, or reduce the likelihood thereof.

A channel cover 330 sealing the cooling channel 300 may be coupled to the lateral wall 320 of the cooling channel 300 by any suitable method, e.g., welding. FIG. 7 illustrates the cooling channel 300 viewed from the bottom with the channel cover 330 removed.

In the exemplary embodiment of the present invention, all of the outer wall 210 and the floor surface 260 of the module housing 200 and the lateral wall 320 of the cooling channel 300 may be integrally formed, e.g., through the cast process, so that a water leakage region does not exist (or an area vulnerable to water leakage is not formed), and further, the cooling channel 300 is provided in the lower portion of the floor surface 260 of the module housing 200, e.g., the outside of the internal space of the module housing 200, so that even when the coolant unintentionally leaks from the cooling channel 300, it is possible to prevent the coolant from flowing into the internal space of the module housing 200 in which the cell stack 100 is present, or to reduce the likelihood thereof.

As a result, in the exemplary embodiment of the present invention, the plurality of cell stacks 100 is inserted to simplify an assembly process and components and effectively satisfy high power demands, it is possible to effectively cool the plurality of cell stacks 100 through the cooling channel 300, and further, it is possible to effectively protect the plurality of cell stacks 100 from the coolant leakage phenomenon in the cooling channel 300.

Figure 8:
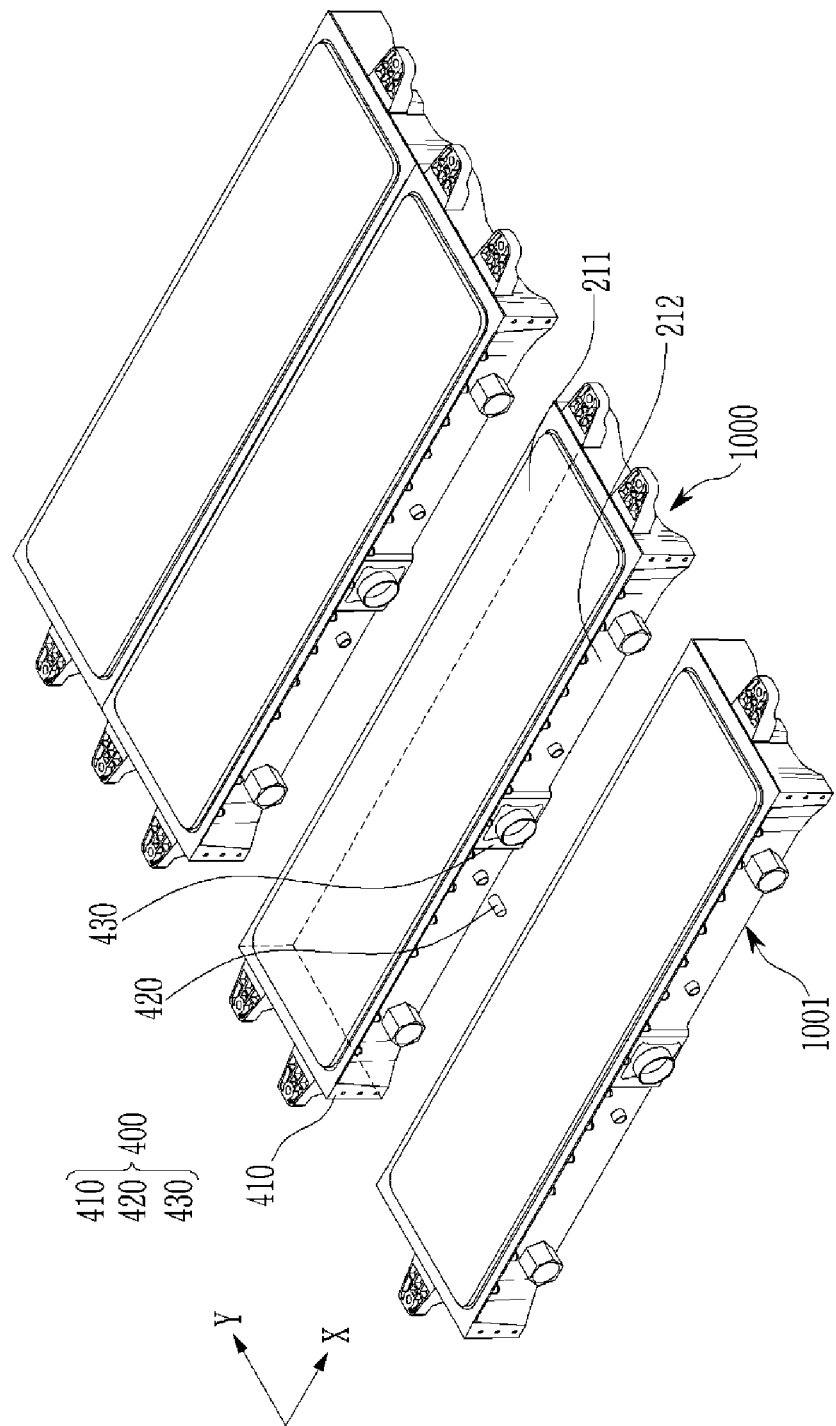
FIG. 8 is a perspective view of a plurality of battery modules according to an exemplary embodiment of the present invention that are coupled to each other.

FIG. 8 illustrates a plurality of battery modules 1000 according to an exemplary embodiment of the present invention that are interconnected with each other. For example, FIG. 8 illustrates an embodiment in which the battery modules 1000 are coupled to each other to form a large pack.

As illustrated in FIG. 8, the battery module 1000 according to an exemplary embodiment of the present invention may further include a coupling part 400 provided in the module housing 200 for coupling to an adjacent module housing 1001.

In the module housing 200 of the present invention, the plurality of receiving parts 220 are provided with the plurality of cell stacks 100, thereby effectively achieving high output. Power requirements of an electrical energy consuming device may exceed an output that can be provided by the battery module 1000 according to the exemplary embodiment of the present invention. Thus, the battery modules 1000 may be coupled to each other to meet the required power, thereby making it possible to realize a large pack structure. FIG. 8 illustrates an embodiment in which the coupling parts 400 between the corresponding module housing 200 and the adjacent module housing 1001 are coupled to each other.

The coupling part 400 may be provided in various suitable types and shapes, and FIG. 8 illustrates fastening parts 410 fastened to each other through a fastening member, guide parts 420 aligning positions of the respective fastening parts 410 of the corresponding battery module and the adjacent battery module, and connection parts 430, which are connection passages of a bus bar for electrical connection with the adjacent module housing 1001 according to an exemplary embodiment of the present invention.

As illustrated in FIG. 8, in the battery module 1000 according to an exemplary embodiment of the present invention, the coupling parts 400 may be provided on (or at) the first wall 211 and the second wall 212 positioned in the second direction Y (or spaced from each other in the second direction Y) among the outer walls 210 of the module housing 200, and the coupling part 400 provided on the second wall 212 of the module housing 200 may be coupled to the coupling part 400 provided on the first wall 211 of the adjacent module housing 1001.

The coupling parts 400 may be disposed (or located) in the module housing 200, and as shown in FIG. 8, may be disposed on the outer wall 210 of the module housing 200. The coupling parts 400 may be respectively provided in every two sides that face each other among the four sides of the outer wall 210 such that the plurality of battery modules can be coupled to each other.

For example, in the battery module 1000 according to an exemplary embodiment of the present invention, because the plurality of cell stacks 100 are inserted into the module housing 200 and the cell stacks 100 include the plurality of unit cells 110 aligned in the first direction X, the module housing 200 may have a cross section of a rectangular shape having a length in the first direction X that is greater than a width in the second direction Y.

Accordingly, even when the plurality of module housings 200 are aligned in one line or coupled to each other through the coupling parts 400, the coupling parts 400 may be disposed on the first wall 211 and the second wall 212 positioned in the second direction Y among the outer wall 210 of the module housing 200 so that an entire length of the plurality of module housings 200 may be reduced. However, the present invention is not limited thereto, and a cross-sectional shape of the module housing 200 or a location of the coupling part 400 on the outer wall 210 may not be limited to the above-stated description.

Accordingly, the coupling part 400 disposed on the first wall 211 of any one of the module housings 200 may be coupled to the coupling part 400 disposed on the second wall 212 of the other of the adjacent module housing facing the first wall 211, and the coupling part 400 disposed on the second wall 212 of any one of the module housings 200 may be coupled to the coupling part 400 disposed on the first wall 211 of the adjacent module housing 1001 facing the second wall 212.

The coupling part 400 disposed in the first wall 211 in the outer wall 210 of the module housing 200 is configured to be inserted into the coupling part 400 of the adjacent module housing 1001 such that the corresponding module housing 200 and the adjacent module housing 1001 can be coupled to each other. For example, a fastening part 410, a guide pin of a guide part 420, and a connection tunnel of a connection part 430 may be disposed in the first wall 211.

In addition, the coupling part 400 disposed in the second wall 212 may be inserted into the coupling part 400 of the adjacent module housing 1001 such that the corresponding module housing 200 and the adjacent module housing 1001 may be coupled to each other. For example, a fastening part 410, a guide pin of a guide part 420, and a tunnel insertion part of a connection part 430 may be disposed in the second wall 212. However, an insertion relationship and each constituent element of the coupling parts 400 disposed in the first wall 211 and the second wall 212, respectively, are not limited thereto, and may have any suitable shape.

Figure 9:
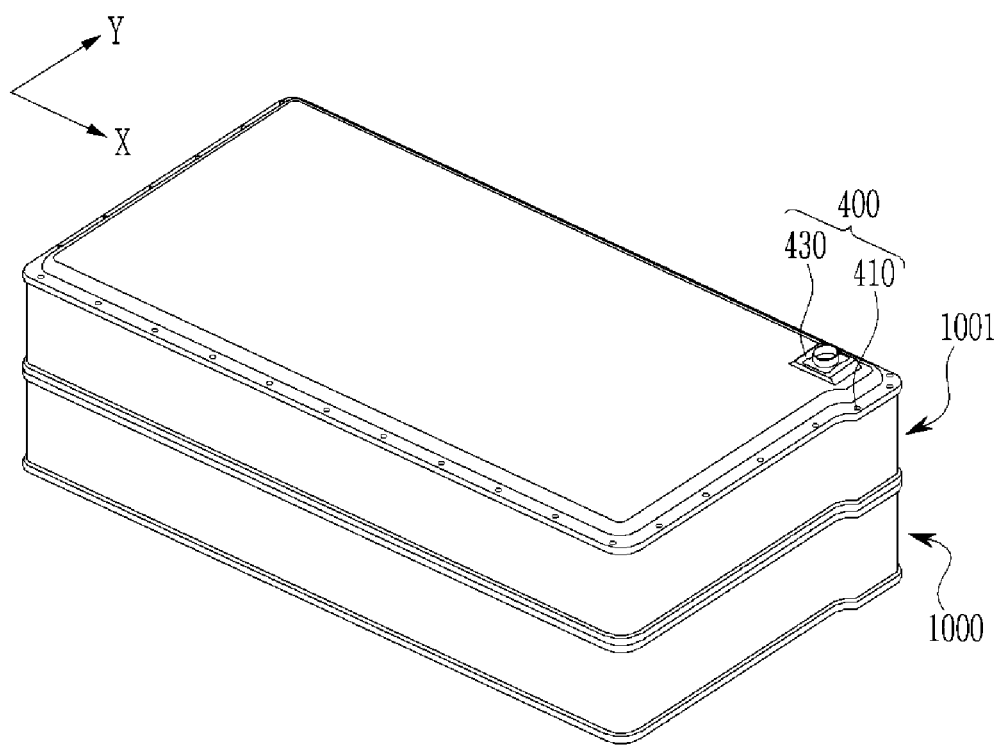
FIG. 9 is a view illustrating a figure in which battery module according to another exemplary embodiment of the present disclosure are coupled to each other.

FIG. 9 illustrates a figure in which a plurality of battery modules according to another exemplary embodiment of the present disclosure are provided and are interconnected. That is, FIG. 9 illustrates a figure in which the battery modules are coupled to each other to form a large pack (e.g., a battery pack).

As shown in FIG. 9, the coupling parts 400 are formed on the upper surface (or module cover) and the bottom surface of the battery module, and the coupling parts 400 between the battery modules adjacent to each other are coupled to each other. Accordingly, the plurality of battery modules may be stacked in the vertical direction (directions perpendicular to the first direction X and the second direction Y) through the coupling parts 400.

For example, the connection part 430 disposed on the upper surface of the battery module 1000 may be inserted into the connection part 430 disposed on the bottom surface of the adjacent battery module 1001. In addition, the connection parts 430 may be connection passages of the bus bar for electrical connection with the adjacent battery modules.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SOME OF THE SYMBOLS

| | |
|---|---|
| 100: cell stack | 110: unit cell |
| 120: end support | 122: second rib |
| 200: module housing | 210: outer wall of module housing |
| 211: first wall | 212: second wall |
| 215: first space | 216: second space |
| 217: third space | 220: receiving part |
| 230: separation wall | 240: end wall |
| 242: first rib | 250: fixing wall |
| 260: floor surface of module housing | 300: cooling channel |
| 310: flowing space | 320: lateral wall of cooling channel |
| 330: channel cover | 350: guide protrusion |
| 400: coupling part | 410: fastening part |
| 420: guide part | 430: connection part |
| 1000: battery module | 1001: adjacent module housing |

What is claimed is:
1. A battery module comprising:
a plurality of cell stacks, each of the cell stacks comprising:
a plurality of unit cells arranged in a first direction; and
an insulation member around the plurality of unit cells; and
a module housing, in which a plurality of receiving parts are provided, each of the cell stacks from among the plurality of cell stacks being located in a receiving part from among the plurality of receiving parts,
wherein each of the receiving parts comprises a fixing wall, the fixing wall being around the cell stack received therein and being in contact with the cell stack,
wherein the module housing comprises a floor surface and end walls extending from the floor surface, the end walls comprising a first end wall and a second end wall at respective sides of each of the receiving parts in the first direction to engage end surfaces of respective sides of the cell stack received in the respective receiving part in the first direction,
wherein the first end wall faces an outer wall of the module housing and is spaced apart from the outer wall along the first direction, defining a first space between the first end wall and the outer wall, wherein the end walls are curved outwardly such that central portions thereof are located further from the end surfaces of the cell stacks than other portions of the end walls, defining a third space between the respective end surface and the respective end wall, wherein each of the cell stacks further comprises a pair of end supports at opposite end portions thereof in the first direction and having end surfaces corresponding to the end surfaces of the respective cell stack, and wherein the end surfaces of the end supports are recessed inwardly so that central portions thereof are further from the respective end wall than other portions of the respective end surface of the respective end support.

2. The battery module of claim 1, wherein the module housing further comprises a separation wall that extends in the first direction and partitions an inner space surrounded by the outer wall of the module housing to form adjacent ones of the plurality of receiving parts along a second direction that is perpendicular to the first direction, and wherein the separation wall corresponds to a part of the fixing wall of the adjacent ones of the plurality of receiving parts, and wherein the separation wall contacts a side surface of the respective cell stacks received in the adjacent ones of the plurality of receiving parts.

3. The battery module of claim 1, wherein a first receiving part and a second receiving part from among the plurality of receiving parts are arranged along the first direction in the inner space of the module housing, and wherein the second end walls of the first receiving part and the second receiving part are spaced apart from each other and face each other, defining a second space between the second end walls of the first and second receiving parts.

4. The battery module of claim 1, wherein an inner surface of the end wall contacts the respective cell stack, and wherein an outer surface of the end wall comprises a plurality of first ribs.

5. The battery module of claim 4, wherein the plurality of first ribs extend in a third direction of the end wall and are spaced apart from each other in a second direction that is perpendicular to the first direction.

6. The battery module of claim 1, wherein the end support comprises a plurality of second ribs that protrude toward the end wall.

7. The battery module of claim 6, wherein the plurality of second ribs are spaced apart from each other in a third direction of the end support in a lattice shape.

8. The battery module of claim 2, wherein the separation wall, the end walls, and the outer wall are integral with the floor surface of the module housing.

9. The battery module of claim 1, further comprising a cooling channel under the floor surface of the module housing, the cooling channel being configured to accommodate a flow of coolant.

10. The battery module of claim 9, wherein lateral walls of the cooling channel are integral with the floor surface of the module housing.

11. The battery module of claim 1, wherein the module housing further comprises coupling parts, the coupling parts of the module housing being configured to be coupled to coupling parts of an adjacent module housing.

12. The battery module of claim 11, wherein the coupling parts are at a first outer wall and a second outer wall of the module housing in a second direction, and wherein a coupling part of the coupling parts at the second outer wall of the module housing is configured to be coupled to a coupling part of the coupling parts at a first outer wall of the adjacent module housing.

13. The battery module of claim 1, wherein the end walls are integral with the floor surface of the module housing.

* * * * *